United States Patent [19]

Weiler

[11] 4,106,790
[45] Aug. 15, 1978

[54] VEHICLE STEP

[75] Inventor: Raywood C. Weiler, Fontana, Calif.

[73] Assignee: Blackstone Manufacturing Co., Inc., Chicago, Ill.

[21] Appl. No.: 785,058

[22] Filed: Apr. 6, 1977

[51] Int. Cl.² .............................................. B60R 3/02
[52] U.S. Cl. ..................................... 280/166; 182/88
[58] Field of Search .................... 280/166; 182/88, 91, 182/95, 96

[56] References Cited

U.S. PATENT DOCUMENTS

| 2,575,615 | 11/1951 | Crump | 280/166 X |
| 2,764,422 | 9/1956 | McDonald | 182/91 |
| 2,809,849 | 10/1957 | Benne | 182/91 X |
| 3,889,997 | 6/1975 | Schoneck | 182/91 X |
| 4,053,172 | 10/1977 | McClure | 182/91 X |

FOREIGN PATENT DOCUMENTS 1,350,593  1963  France .................... 280/166

Primary Examiner—David M. Mitchell
Assistant Examiner—Norman L. Stack, Jr.
Attorney, Agent, or Firm—Arnstein, Gluck, Weitzenfeld & Minow

[57] ABSTRACT

A vehicle step which includes a pair of pivotally supported levers or links to which are pivotally connected a pair of pivotally connected tread supporting members. Said members engage a transverse bar which together with the levers guide the tread in its movement so that it may be easily moved to extended or retracted positions with fingertip ease.

5 Claims, 4 Drawing Figures

VEHICLE STEP

FIELD OF THE INVENTION

The present invention relates to a novel step particularly adapted for use on motor homes, recreational vehicles, automotive trailer vehicles and the like but, of course, suitable for other applications, wherever the features of such step may be desirable.

SUMMARY OF THE INVENTION

One of the objects of this invention is the provision of a vehicle step which may be quickly and easily extended to operative position and moved under the vehicle to retracted position when not in use.

Another object of this invention is the provision of a step which is substantially locked in operative or retracted positions against inadvertent dislodgment but which may be purposefully dislodged from either position with fingertip ease.

A further object of this invention is the provision of a step of the foregoing character which is sturdy in construction, durable and efficient in service and economical to manufacture.

These and other objects and advantages of the present invention are attained by the provision of a dual pivotal arrangement which maintains both sides of the step aligned and parallel to the vehicle door. This arrangement insures against binding, jamming and sticking of the parts in their movement.

Other and further objects and advantages of this invention will become apparent from the following description when considered in connection with the accompanying drawings.

BRIEF DESCRIPTION OF A PREFERRED EMBODIMENT

Figure 1:
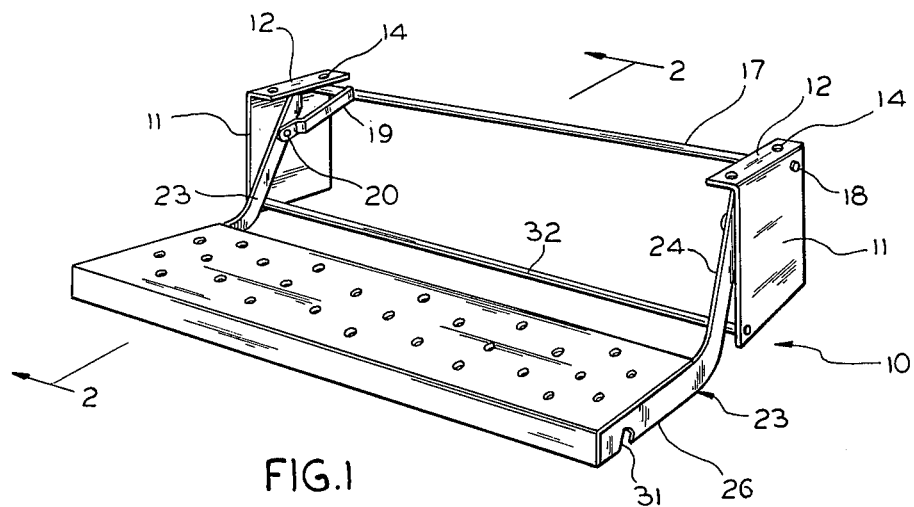
FIG. 1 is a perspective view of a preferred embodiment of my invention showing the tread in extended or operative position.

The step 10 of the present invention comprises a pair of allochiral brackets, 11, 11 shaped substantially as illustrated, said brackets being formed preferably from heavy gauge sheet metal and each having a flange 12 along the upper edge thereof, each flange 12 has holes 14 to receive suitable fastening means, such as bolts or rivets, by which the brackets 11 may be attached to a vehicle body. The brackets 11 are identical in construction, both being fabricated by the same tools. As seen in FIG. 1, the brackets 11 are arranged with the flanges 12 in confronting relation and each bracket is provided with an aperture 16 disposed in close proximity to the upper rearward corner thereof. The apertures 16 of both brackets are arranged in axial registration and serve as journal bearings for a shaft 17 which extends through the apertures, the ends of the shaft being provided with suitable friction fastening elements 18 for retaining the shaft in assembled relation while permitting rotation of the shaft within the apertures 16.

A pair of levers 19, 19, each formed of heavy gauge sheet metal, are welded to the rod 17, each in close proximity to a respective end of the shaft, with both levers 17, 17 being disposed inwardly of the pair of brackets 11, 11. The distal end of each lever 17 terminates in an offset portion 21 provided with a hole 22.

A pair of identical tread supporting members 23, 23 are pivotally secured by rivets to respective levers 19, as at 20. Each of the members 23 includes forward and rearward arms 26 and 24 in angular relation and the rearward arm 24 of each member 23 includes a terminal portion 27 extending beyond the pivotal connection 20 which is cut away, as illustrated clearly in FIGS. 2-4.

The forward arms 26 of the members 23 carry a metal tread 28 which is provided with depending front and side flanges 29, the side flanges of which are welded to the forward arms 26 of the supporting members. The surface of tread 28 is provided with a plurality of embossings which are pierced to minimize slippage. Each of the arms 26 is provided with a downwardly opening notch 31 for a purpose, as will be hereafter explained. A bar 32 extends between the lower forward portions of the brackets 11 and is welded thereto to form a rigid structure.

Figure 2:
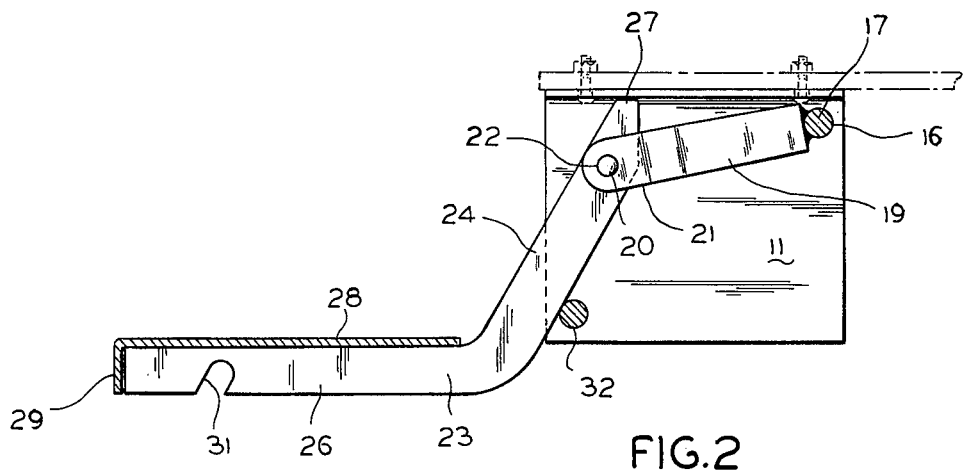
FIG. 2 is a cross-sectional view taken substantially on line 2—2 of FIG. 1.

Referring to FIG. 2, the step 10 is shown in operative position wherein the rearward arms 24 are rested on the bar 32 and the ends 27 of the rearward arms abut the underside of the flanges 12 of the brackets. In this position the tread surface is disposed in a horizontal plane and the step is securely locked in operative position against inadvertent dislodgement.

Figure 3:
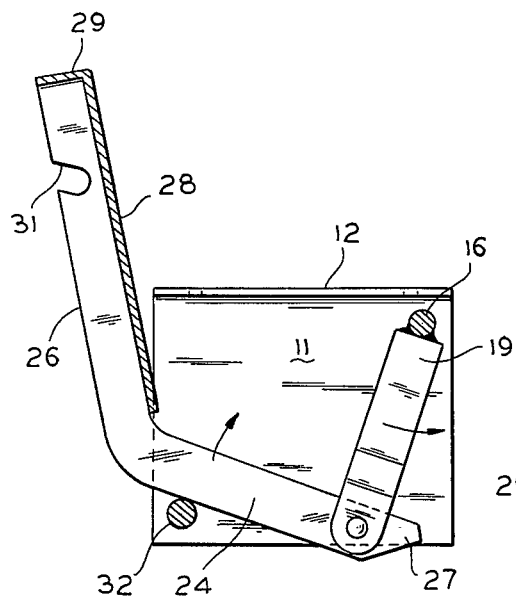
FIG. 3 is a view similar to FIG. 2 but showing the step in an intermediate position.
Figure 4:
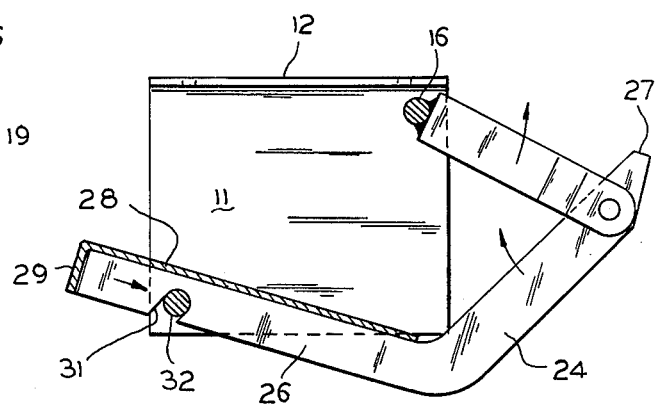
FIG. 4 is a view similar to FIG. 2 but showing the step in fully retracted or inoperative position.

In order to move the step to retracted or inoperative position, the forward flange 29 of the tread is grasped, as with a finger or a toe, and is rocked upwardly with the rearward arms 24 resting on the rod 32 to cause the pivotal connection 20 to move to an over center position which is below a line drawn between the centers of the shaft 17 and bar 32. FIG. 3 illustrates an intermediate position in which the pivotal connection 20 has passed over center and the parts are now in condition for further movement to inoperative position. During such movement the supporting members 23 are in engagement with the bar 32 and there results a camming effect on the parts which causes the levers 19 to rock in a counterclockwise direction, as indicated by the arrow in FIG. 3, to the point where the notches 31 are in registration with the bar 32, as illustrated in FIG. 4. The step now is secured in inoperative or retracted position against inadvertent dislodgement.

It will be understood that in moving the step to operative or inoperative positions, the full weight of the step is carried by the bar 32 and by the levers 19. Thus, a minimum of effort is required to move the step to one position or the other. The bar 32 functions in the nature of a fulcrum for the supporting members 23 thereby facilitating shifting of the pivotal connection 20 to over center position, in either direction of movement of the tread 28 to extended or retracted position. The levers 19, of course, influence the direction of movement of the step 10 as it is moved from one position to another.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A retractable step for vehicles and the like comprising a pair of spaced vertical brackets, each having a flange along the top edge, with the flanges being directed towards each other, a transverse shaft journalled in said brackets for rocking movement, a pair of spaced levers fixed to said shaft each in close proximity to a respective bracket, a pair of tread supporting members each having forward and rearward arms angularly related, with each rearward arm being pivotally connected to a respective lever at a point spaced from the upper end of the rearward arm, a tread rigidly secured to the forward arms, a transverse bar extending between said brackets and disposed forwardly and below said shaft, each of said flanges overhanging a respective supporting member, the upper end of each rearward arm abutting a respective flange and an intermediate portion of each supporting arm engaging the bar when the tread is disposed in operative position.

2. The invention as defined in claim 1 in which each forward arm has a notch to receive the bar when the tread is disposed in inoperative position.

3. A retractable step for vehicles and the like comprising a pair of spaced brackets adapted to be secured to the underside of the body of the vehicle, a pair of levers each pivotally supported by a respective bracket, a pair of tread supporting members each having forward and rearward arms angularly related with each rearward arm being pivotally connected to a respective lever at a point spaced from the upper end of the rearward arm, a tread rigidly secured to the forward arms, a transverse bar extending between said brackets and disposed forwardly and below the pivotal axis of said pair of levers, the upper end of each rearward arm abutting the underside of the vehicle body and an intermediate portion of each supporting arm engaging the bar when the tread is disposed in operative position.

4. The invention as defined in claim 3 in which each forward arm has a notch to receive the bar when the tread is disposed in inoperative position.

5. The invention as defined in claim 4 in which the transverse bar constitutes a fulcrum support for the tread supporting members in their movement to and from operative and inoperative positions.

* * * * *